Dec. 20, 1960 T. RIVINIUS 2,964,911
CRAWLER TYPE CONTROL SYSTEM
Filed May 11, 1959 2 Sheets-Sheet 1

INVENTOR:
THEODORE RIVINIUS
By Sutherland, Porter & Taylor
ATTORNEYS.

Dec. 20, 1960 T. RIVINIUS 2,964,911
CRAWLER TYPE CONTROL SYSTEM
Filed May 11, 1959 2 Sheets-Sheet 2

INVENTOR:
THEODORE RIVINIUS
By Sutherland, Rohter & Taylor
ATTORNEYS.

United States Patent Office

2,964,911
Patented Dec. 20, 1960

2,964,911

CRAWLER TYPE CONTROL SYSTEM

Theodore Rivinius, Elgin, N. Dak.

Filed May 11, 1959, Ser. No. 812,358

1 Claim. (Cl. 60—97)

This invention relates to steering clutch systems of crawler type vehicles.

It has been common practice in crawler type vehicles, such, for example, as the Caterpillar D-8 tractors of the Caterpillar Company, to provide each of the tracks with a so-called steering clutch in its drive system, and to provide for steering of the vehicle by manual disengagement and engagement of the clutch in the drive to one or the other of the tracks. This manipulation of the steering clutches has been accomplished by means of long levers, acting through links, and assisted by booster springs. To totally disengage the clutch, it was necessary to move the lever through about eighteen inches of travel, against a great deal of force, since the clutches are strongly biased toward engagement.

This arrangement had numerous disadvantages. The manipulation of the levers was a laborious task. Since the throw of the levers was so long, there was a strong temptation on the part of the operator to move the lever through less than its full distance, hence, to slip the clutch. The long throw of the levers also made steering of the vehicle slower and therefore more dangerous, than it would have been with a steering system which responded more quickly and easily to the manipulation of the operator.

One of the objects of this invention is to provide a steering clutch control for a crawler type vehicle, which is adapted to be installed on existing vehicles, which is easy to install, simple to operate, quick to respond to manipulation, safe and dependable.

Other objects will become apparent to those skilled in the art in the light of the following description and accompanying drawing.

In accordance with this invention, generally stated, a control system is provided for use with the steering clutch system of a crawler type vehicle, the control system including hydraulic cylinders aligned back to back, with pistons, sliding in the cylinders, and having rods connected to the throw out arms of the clutches. The hydraulic cylinders are mounted on the frame of the vehicle by means of a mounting bracket which permits a certain amount of floating of the cylinders. The cylinders are supplied with hydraulic fluid through a valve which is so constructed as to provide a smooth but positive engagement and disengagement of the clutches.

The control system of this invention permits steering of a crawler type vehicle with the fingers of one hand, safely and surely, at higher speeds and with less strain on the vehicle and its components than has been possible heretofore.

Figure 1:
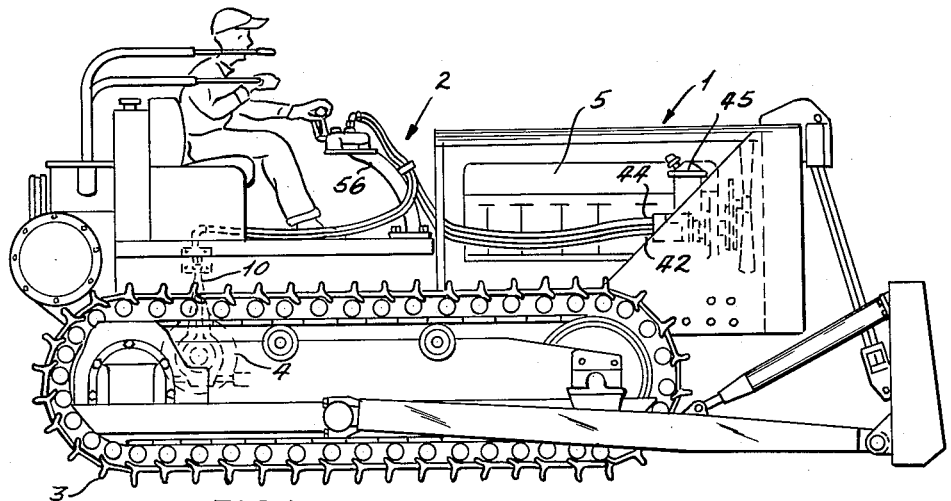
Figure 1 is a view in side elevation of a crawler type tractor equipped with a control system constructed in accordance with one embodiment of this invention.

Referring now to the drawing for one illustrative embodiment of the control system of this invention, reference numeral 1 indicates a crawler type vehicle equipped with a hydraulic control system 2. The vehicle 1 has a pair of tracks 3, both of which are driven, through clutches 4, by an engine 5. In the embodiment shown, the engine 5 has a fan shaft 6, to which a pulley 7 is secured. The shaft 6 and pulley 7 are driven by the engine 5, and the pulley 7 is connected to a pump pulley 8, by a belt 9.

The clutches 4 are each provided with throw out arms or yokes 10. The throw out arms 10 are strongly biased to an outward, clutch engaging position, by means of springs, not here shown.

The control system 2, in the embodiment shown, includes a hydraulic cylinder assembly 20, a hydraulic pump 40, and a valve assembly 50.

The cylinder assembly 20 includes a pair of cylinders 21, mounted back to back on opposite sides of a heavy mounting plate 22. In this embodiment, the cylinders 21 are mounted on the plate 22 by means of four rods 23, extending through the plate 22, and through holes extending laterally through cylinder head plates 24. The ends of the rods 23 are threaded, and the entire assembly is clamped together by nuts 25 on the threaded ends of the rods 23. Each of the cylinders 21 contains a piston 26, shown somewhat diagrammatically in Figure 3. A piston rod 27, mounted on each of the pistons 26, extends through a gland in the head plate 24.

In this embodiment, the outer ends of the piston rods 27 are tapped and threaded to receive the threaded end of a shank of a bearing block 28. The bearing blocks 28 pivotally connect the piston rods 27 to the throw out arms 10, by means of wrist pins 29. Each of the cylinder head plates 24 is provided with a port 30, which communicates with the interior of the cylinder 21 between the cylinder head plate 24 and the piston 26. The ports 30 are tapped to receive a hydraulic fluid fitting 31, to which high pressure hydraulic hoses 32 are connected.

Figure 3:
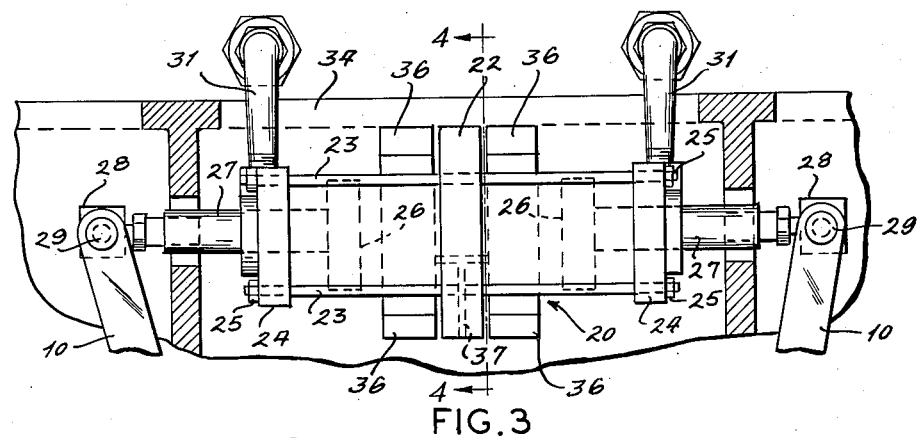
Figure 3 is a sectional view taken along the line 3—3 of Figure 2.
Figure 4:
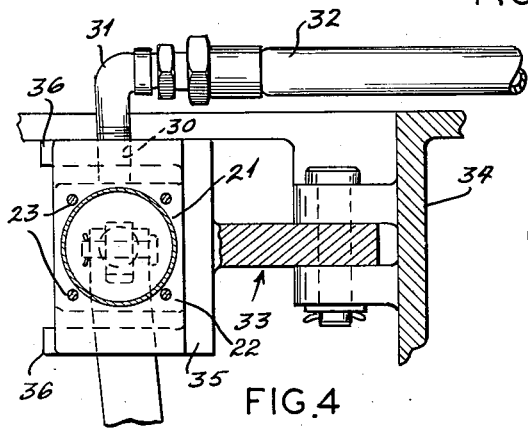
Figure 4 is a sectional view taken along the line 4—4 of Figure 3.
Figure 5:
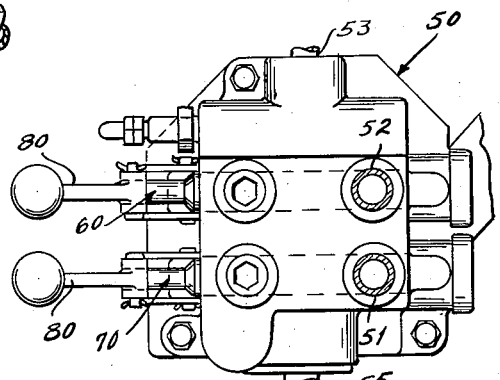
Figure 5 is a top plan view, partly in section, of a control valve.

The cylinders 21 are held in operative position and mounted on the frame of the tractor, by means of a bracket 33. The bracket 33 consists of a plate 34, bolted or pinned to the frame of the tractor, and having a pair of spaced fork members 35. Each of the fork members 35 consists of an upper end lower finger 36, embracing a cylinder 21. The mounting plate 22 is seated between the two fork members 35. As can be seen from Figures 3 and 4, the fingers 36 embrace the cylinders 21 loosely, and the mounting plate 22 fits somewhat loosely between the fork members 35. Also, the fork members 35 are open ended, so that the cylinders float within the fork members. A T-shaped vent passage 37 through the mounting plate 22, provides communication, for both of the cylinders 21, with the atmosphere, at their adjacent back ends, as shown in Figure 3.

The hydraulic hoses 32 are connected to fittings in valve ports 51 and 52 in the valve 50. A pressure side hose 41 is connected, by means of fittings, to the pressure port 53 of the valve at one end, and to the discharge port 42 of the pump 40, at the other end. An exhaust hose 43 is connected, by means of fittings, to an exhaust port 55 of the valve at one end, and to a suction port 44 of the pump 40, at the other end.

The pump 40 can be of any suitable kind. It is driven by the pulley 8, which is mounted on a pump shaft. A fluid reservoir 45 completes the pump assembly.

In this embodiment, the valve 50, mounted on a pedestal 56, is a spool valve. Two spool cylinders, 60 and 70, are shown, somewhat diagrammatically, in Figure 7. The spool cylinders are biased toward the position shown in Figure 7, by springs, not here shown. Handles 80 are pivotally linked to the outer ends of the spool cylinders 60 and 70, and to the body of the valve, to permit axial movement of the spool cylinders by manipulation of the handles 80.

The spool cylinder 60 slides in a bore 61 within the valve body. The spool cylinder 70 slides within a bore 71 in the valve body. A main fluid passage 90 connects the pressure port 53, the bore 61, and the bore 71, with the exhaust port 55. A by-pass passage 91, connects the pressure port 53 with the exhaust port 55, but is normally closed by a check valve 92, biased toward closed position in a direction to permit fluid to flow from the pressure port to the exhaust port when the bias of the check valve is overcome. The by-pass passage 91 is also connected to communicate with the bores 61 and 71, by means of passages 62 and 72 respectively, between the check valve 92 and the exhaust port 55. A central passage 94 connects the pressure port 53 with the bore 61 and the bore 71, and, like the passage 90, interconnects the bores 61 and 71. An extension of the passage 94 beyond the bore 71 toward the exhaust port 55 but not communicating therewith, is connected to the passage 90 intermediate the bores 61 and 71, by a passage 96.

The valve port 51 is connected directly to the bore 61 at the passage 94, and, through a passage 63, is connected to the bore 61 at the passage 62. The cylinder port 52 is connected, at the passage 94, with the bore 71, and, through a passage 73, to the bore 71 at the passage 72.

Figure 7:
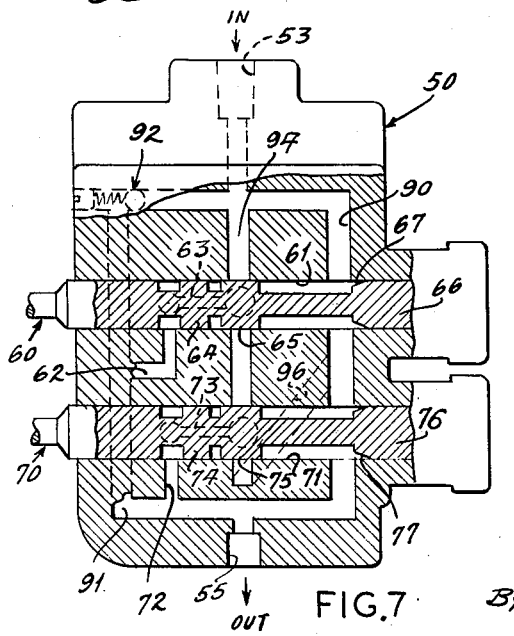
Figure 7 is a top plan view, partly broken away and partly in section, of the control valve shown in Figures 5 and 6.
Figure 6:
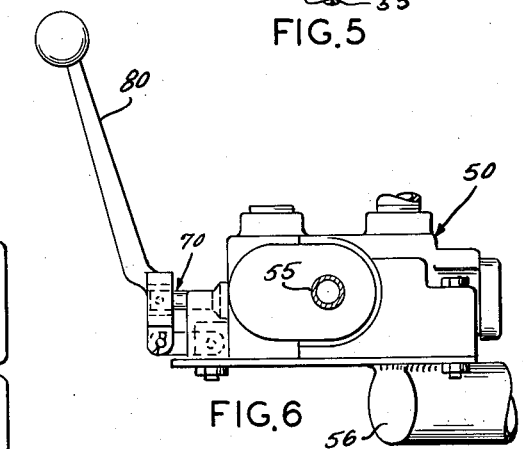
Figure 6 is a view in side elevation, partly in section, of the control valve of Figure 5.

The spool valve 60 is provided with three operating spools 64, 65 and 66. As shown in Figure 7, the spool cylinder 60 is normally biased into a position at which the spool 64 permits communication between the passages 63 and 62, through the bore 61; the spool 65 blocks communication between the port 51 and the passage 94 through the bore 61, and the spool 66 permits communication of the bore 61 with the pressure port 53, through passage 90, and with the bore 71 through the connecting section of the passage 90.

The spool cylinder 70 is provided with operating spools 74, 75 and 76. The spool cylinder 70, as shown in Figure 7, is normally biased into a position at which the spool 74 permits communication of the passage 73 with the passage 72, through the bore 71; the spool 75 blocks communication between the port 52 and the passage 94 through the bore 71, and the spool 76 permits communication between the intermediate section of the passage 90 and the bore 71 and between the bore 71 and the exhaust port 55 through the passage 90.

It will be seen from Figure 7, that the leading edge of each of the spools 66 and 76 is chamfered, as indicated at 67 and 77, respectively.

Figure 2:
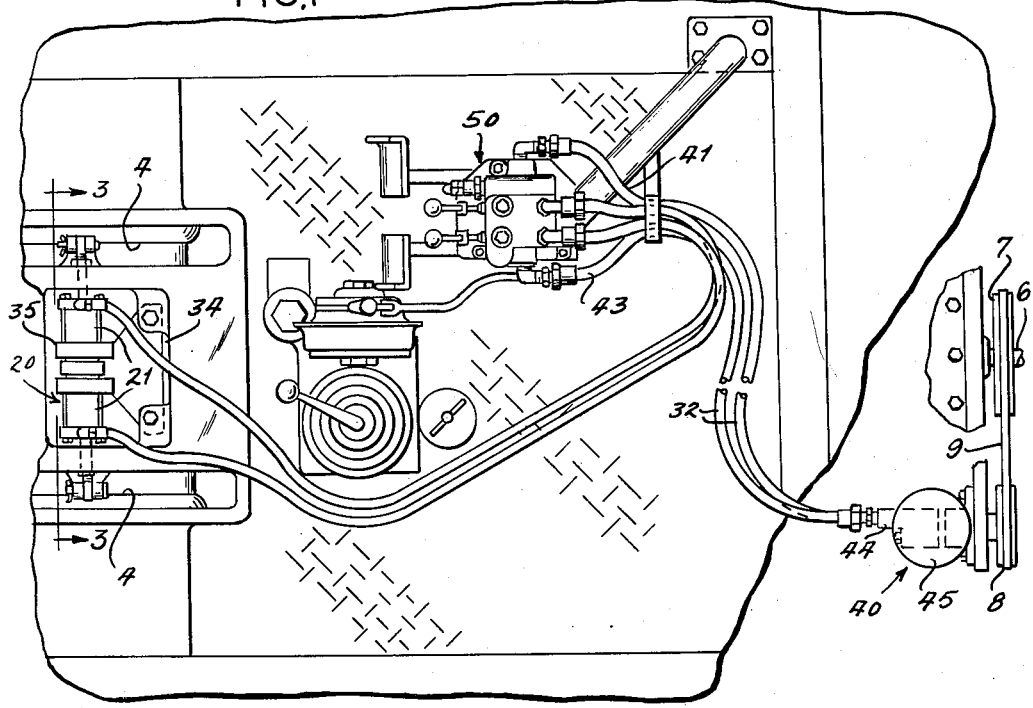
Figure 2 is a fragmentary top plan view of the tractor shown in Figure 1, partly broken away.

In installing the control system of this invention, on a crawler type vehicle equipped with the conventional long handled levers, it is only necessary to remove the levers and their linkages to the throw out arms 10. The bracket 33 is then bolted to the frame of the vehicle, as shown in Figure 2. The cylinder is then simply slid into position within the embrace of the forks 35. The fact that the forks are open ended, and that the cylinders are capable of considerable play vertically, makes it simple to connect the bearing blocks 28 of the piston rods 27 to the throw out arms 10. Adjustment of the throw of the piston rods 27 with respect to the throw out arms 10 is easily made by screwing the threaded shank of the bearing blocks 28 into or out of the piston rods 27.

The pedestal 56, with the valve 50 on it, is welded, bolted, or otherwise secured to the frame of the vehicle. The pump assembly 40 is mounted on the engine or frame of the vehicle, the pulley 7 is mounted on the shaft 6, and the belt 9 is put into place around the pulleys 7 and 8. The hoses 32 are connected to the cylinder assembly 20 and the valve 50, and the hoses 41 and 43 are connected to the valve 50 and the pump 40. The system is filled with hydraulic fluid by filling the reservoir 45, and the control system is ready for operation.

In operation, assuming that the engine 5 is running, driving the pump 40, hydraulic fluid, issuing from the discharge port 42 of the pump, flows through the hose 41 to the pressure port 53 of the valve 50, through the passage 90, out of the exhaust port 55 of the valve, and back, through the hose 43, to the suction port 44 of the pump. There is no substantial pressure of the hydraulic fluid in the cylinders 21, since the cylinder ports 51 and 52 of the valve 50 are connected, through passages 63 and 73 respectively, to the suction side of the pump, by way of passages 62 and 72, and 91. The pistons 26 are therefore in their outermost position, with respect to one another, being biased to that position by the bias of the throw out arms 10, which are themselves biased to clutch-engaging position.

If, now, it is desired to stop one of the tracks by disengaging its clutch, it is only necessary to pull back on the handle of the spool cylinder which controls the admission of fluid to the cylinder actuating the throw out arm of the steering clutch of the desired track. In practice, a movement of the spool cylinder of one quarter of an inch is sufficient.

Assuming that it is desired to stop the track not shown in Figure 1, the handle 80 of the spool cylinder 60 is pulled back, moving the spool cylinder 60 to the left as viewed in Figure 7. As the spool cylinder 60 moves, the passage 90 is gradually obstructed, first by the chamfered portion 67 of the spool 66, and then by the unchamfered part of that spool. Simultaneously, the passage 62 is being obstructed by the spool 64, to block communication of the passage 63, hence the port 51, with the exhaust port 55; and the spool 65 is clearing the passage 94, permitting communication of the passage 94 with the port 51. Accordingly, the hydraulic fluid entering the pressure port 53 flows through the passage 94, the port 51, the hose 34, the port 30, and into the cylinder 21 between the cylinder head plate 24 and the piston 26. The piston is moved toward the mounting plate 22, but the cylinder is prevented from moving laterally toward the throw out arm 10, by the bearing of the mounting plate 2 against the fingers 36 of the fork 35. Therefore, the piston rod 27 moves inwardly, moving the throw out arm 10 against the bias of its spring, and disengaging the clutch.

If it is desired to disengage the other clutch, while the first clutch is engaged, it is only necessary to pull back the handle which moves the spool cylinder 70. As the spool cylinder 70 moves to the left, as viewed in Figure 7, the spool 76 begins to block the passage 90, gradually as the chamfered section 77 crosses the passage, and then completely as the following, unchamfered section blocks the passage. Simultaneously, the spool 74 acts to block the communication between the passage 73 and the passage 72, and the spool 75 moves to clear the communication between the passage 94 and the port 52. In this instance, the fluid is supplied to the port 52 by way of the passage 96, since the communicating section of the passage 94 between the two bores 61 and 71 is blocked by the spool 65 of the spool cylinder 60. The operation of the cylinder in disengaging the other clutch is the same.

In each instance, when the cylinder has taken all of the hydraulic fluid which is permitted by the throw of the throw out arms 10, and as additional pressure is built up, the check valve 92 opens, permitting the flow of fluid through the by-pass passage 91, to the exhaust port 55, thence to the suction side of the pump. The additional hydraulic fluid that is necessary for the charging of the cylinders, is supplied from the reservoir 45.

If it is desired to stop both tracks, it is only necessary to pull back both handles. This provides a clear passage from the pressure port 53, through the passage 94, to both ports 51 and 52. The operation when it is desired to stop the other of the tracks when one is already stopped, is apparent from an inspection of Figure 7.

In each case, when a spool cylinder is released and returns to the position shown in Figure 7, the cylinder port associated with it is put in communication with the suction side of the pump, through passage 91, which quickly drains the power cylinder and aids the return of the clutch to engaged position.

The provision of the chamfers 67 and 77 makes for a smooth engagement and disengagement of the clutches, without pounding or jerking of the elements of the control system or the clutches. At the same time, since the throw of the spool cylinders from clutch engaging to clutch disengaging position is so short, and the movement of the spool cylinders is so easy, that sustained slippage of the clutch is eliminated as a practical matter.

It can be seen that other arrangements of spool valve can be used, the particular porting, passage and spool arrangements shown being merely illustrative. It is important, however, to provide a means, such as the chamfer of the spools in the embodiment shown for causing a smooth, though rapid action of the power cylinders in both directions.

Numerous other variations in the construction of the control system of this invention, within the scope of the appended claim, will occur to those skilled in the art in the light of the foregoing disclosure.

Having thus described the invention, what is claimed and desired to be secured by Letters Patent is:

In a control system for crawler type vehicles having steering clutches with oppositely disposed, transversely aligned throw-out arms, the improvement comprising a pair of hydraulic cylinders, mounted back to back on opposite sides of a mounting plate, pistons within said cylinders, piston rods connected at one end to said pistons and at the other end to the said throwout arms, and a mounting bracket for said cylinders, said mounting bracket being secured to the frame of said vehicle and having a pair of fork members floatingly embracing said cylinders on either side of said mounting plate, and spaced to admit said mounting plate between them but to prevent substantial lateral displacement of said mounting plate, hence said cylinders.

References Cited in the file of this patent

UNITED STATES PATENTS

| | | |
|---|---|---|
| 1,812,085 | Davis | June 30, 1931 |
| 2,382,866 | Edge et al. | Aug. 14, 1945 |
| 2,468,628 | Henning | Apr. 26, 1949 |
| 2,788,076 | Whaley | Apr. 9, 1957 |
| 2,792,021 | Greeley | May 14, 1957 |
| 2,825,362 | Hicks | Mar. 4, 1958 |